United States Patent [19]
Cox, Jr. et al.

[11] Patent Number: 5,565,277
[45] Date of Patent: Oct. 15, 1996

[54] INJECTION MOLDING AND EXTRUSION BARRELS AND ALLOY COMPOSITIONS THEREOF

[75] Inventors: Walter G. Cox, Jr., Salem; Schiao F. Chou, Blacksburg, both of Va.

[73] Assignee: Xaloy, Inc., Pulaski, Va.

[21] Appl. No.: 497,135

[22] Filed: Jun. 30, 1995

Related U.S. Application Data

[63] Continuation of Ser. No. 145,650, Nov. 4, 1993, abandoned.
[51] Int. Cl.$^6$ .............................. B32B 15/18; B29C 47/08
[52] U.S. Cl. ............................................. 428/679; 138/143
[58] Field of Search ...................... 428/665, 679, 428/681; 138/142, 143

[56] References Cited

U.S. PATENT DOCUMENTS

| | | | |
|---|---|---|---|
| 3,658,515 | 4/1972 | Saltzman | 75/128 F |
| 3,836,341 | 9/1974 | Saltzman et al. | 29/191.6 |
| 4,103,800 | 8/1978 | Lomax et al. | 428/679 |
| 4,596,282 | 6/1986 | Maddy et al. | 164/76.1 |
| 4,808,486 | 2/1989 | Yamamoto et al. | 428/679 |
| 4,863,661 | 9/1989 | Maddy | 264/127 |
| 5,019,459 | 5/1991 | Chou et al. | 428/679 |
| 5,160,690 | 11/1992 | Cox et al. | 264/328.1 |
| 5,185,162 | 2/1993 | Chou | 425/183 |

FOREIGN PATENT DOCUMENTS

| | | |
|---|---|---|
| 0052092 | 5/1982 | European Pat. Off. . |
| 0348381 | 12/1989 | European Pat. Off. . |
| 0410425 | 1/1991 | European Pat. Off. . |
| 0453345 | 10/1991 | European Pat. Off. . |
| 3833121 | 4/1989 | Germany . |
| 61-143547 | 7/1986 | Japan . |
| 63-202420 | 8/1988 | Japan . |

OTHER PUBLICATIONS

U. S. Pipp, Industrial Products Division, Burlington, NJ, Dec. 7, 1981, pp. 1–32.
Metals Progress—Mid–Jun. 1978, AISI–SAE Standard Alloy Steels, pp. 20–21.
Poole, et al., "High–Strength Structural and High–Strength Low–Alloy Steels," *Metals* Handbook, vol. 1 (Am. Soc. for Metals), pp. 403–420. (9th Ed., 1978).
Colmonoy Technical Data Sheet, Colmonoy Hard–Surfacing Alloy Selector Charts, No. Tech–1C, Wall Colmonoy Corporation, 1987.

*Primary Examiner*—John Zimmerman
*Attorney, Agent, or Firm*—Ostrolenk, Faber, Gerb & Soffen, LLP

[57] ABSTRACT

A bimetallic barrel for use in injection molding and extrusion. The barrel is formed of a backing steel and a metal inlay liner. The backing steel is either a microalloyed steel, carbon steel 1045 or carbon steel 1060. Inlay compositions, including copper containing ones, are disclosed.

9 Claims, 1 Drawing Sheet

INJECTION MOLDING AND EXTRUSION BARRELS AND ALLOY COMPOSITIONS THEREOF

This is a continuation of application Ser. No. 08/145,650, filed on Nov. 4, 1993 now abandoned.

BACKGROUND OF THE INVENTION

1. Field of the Invention

The present invention relates to barrels used in injection molding and extrusion processes and more particularly to bimetallic barrels having alloy inlays. Injection and extrusion processes are widely used in the plastic, chemical, food and ceramic and metal powder industries.

2. Description of the Related Art

In injection molding and extrusion processes, solid plastic resin is heated and liquefied inside a hollow cylinder or barrel by heater bands that envelop the cylinder and by the frictional heat generated by the rotational action of the screw. The molten plastic is discharged from the cylinders and enters a mold. The molten plastic solidifies in the mold to form various objects.

During the plasticization process, the plastic resin will wear against the bore of the cylinder. Besides, the plastic often contains various fillers which are highly abrasive. Also, aggressive chemicals generated during the process can corrode the bore. For instance, fluoropolymer, polyvinyl chloride, and resins containing flame retardants will generate hydrofluoric or hydrochloric acid, which are very corrosive. If the bore of the cylinder is enlarged due to wear or corrosion, the efficiency of the process will decline.

The injection pressure for a plastic injection molding machine is typically between 20,000 and 30,000 psi and could be as high as 37,000 psi. Barrels for plasticizing resins not only have to contain the high pressure but also have to resist corrosion and wear of the bore from the resin.

Alloy steels such as 4140, 6150, and 8620 are often used as backing steels for bimetallic barrels. Their disadvantages are discussed below.

Some barrels are made of heat treated and nitrided steel. These barrels have good strength, but their wear resistant nitrided surface is very thin, usually 0.005. to 0.010 inch. Once this thin nitrided layer is worn out, accelerated wear will follow. Moreover, the nitrided steel has poor corrosion resistance to various corrosive resins.

A more advanced barrel is made by a centrifugal casting process. A corrosion and wear resistant alloy is cast in the bore of a steel cylinder to form an inlay by centrifugal casting. The inlay is typically 0.060 inch to 0.100 inch thick and is metallurgically bonded to the steel cylinder bore. These bimetallic barrels have been very successful in processing various corrosive and abrasive resins.

Bimetallic barrels having an inlay alloy containing nickel, boron, silicon, tungsten, carbon and chromium are widely used. The inlay alloy, designated (A), has tungsten carbide particles embedded in a nickel alloy matrix. The chemical composition is as follows:

|     | C | Si | B | Cr | Fe | Ni | Co | W |
|-----|---|----|----|----|-----|-----|-----|-----|
| (A) | 1.3 to 3.5 | 0.5 to 3.3 | 1.0 to 3.0 | 5.0 max | 25 max | Bal | 3.0 to 7.0 | 25.0 to 50.0 |

However, bimetallic barrels cannot be strengthened by a heat treatment process because the quench process in the heat treatment will crack the hard and brittle inlay. In the manufacturing of bimetallic barrels, generally steel will lose its strength during the slow cooling which is required to prevent the inlay from cracking. In order to contain high pressures, bimetallic barrels are often sleeved with a strong, heat treated steel sleeve on the outside of the high pressure end of the barrel. The sleeve is welded to the barrel. However, barrel failures during injection molding are often attributed to breakage of the weld or collapse of the inside liner.

SUMMARY OF THE INVENTION

In the alloy designated (A), above, as well as in all other alloys discussed herein, the compositions are defined in terms of the weight percentages of the components.

We have found that bimetallic barrels for use in injection molding and extrusion processes made of microalloyed steels or carbon steels such as 1045 and 1060 with inlay liners made of certain alloys are unexpectedly advantageous.

Microalloyed steels are an art recognized family of steels which do not require heat treatment and will acquire the necessary high strength even under slow cooling conditions. This family of steels uses additions of very small amounts of alloying elements, such as vanadium, niobium, titanium, zirconium and rare earth elements, to strengthen the steel. Such steels are described, for example, in an article by Poole et al. in "Metals Handbook," 9th edition, Vol. 1, p. 409, under the heading, "Microalloyed high strength low-alloy steels," which description is hereby incorporated by reference. It is stated in that article that the concentrations of the microalloying additives are generally below 0.15%.

The following is a preferred range of percentages, by weight, of the components of the microalloyed steels:

| C | Si | Mn | V | Fe |
|---|----|----|----|----|
| 0.30 to 0.45 | 0.15 to 1.00 | 1.0 to 1.7 | 0.05 to 0.2 | Bal |

The most preferred percentages are as follows:

| C | Si | Mn | V | Fe |
|---|----|----|----|----|
| 0.34 to 0.40 | 0.15 to 0.80 | 1.20 to 1.65 | 0.08 to 0.13 | Bal |

We have found the following:

(a) It is advantageous to cast alloy (A) in a microalloyed steel. Bimetallic barrels made of microalloyed steel and inlay alloy (A) not only have good corrosion resistance and wear resistance but also a high pressure carrying capability.

(b) Adding copper in inlay alloy (A) improves its corrosion resistance.

(c) Bimetallic barrels having backings made of carbon steel, such as AISI 1045 or AISI 1060, are advantageous since they are very straight and have a low residual stress.

The corrosion resistance of the following inlay alloy, designated (B), is better than that of alloy (A) because copper is added:

|   | C | Si | B | Cr | Fe | Ni | Co | W | Cu |
|---|---|----|---|----|----|----|----|----|----|
| (B) | 1.3 to 3.5 | 0.5 to 3.3 | 1.0 to 3.0 | 5.0 max | 25 max | Bal | 3.0 to 7.0 | 25.0 to 50.0 | 1.0 to 5.0 |

The thickness of the inlay layer in each case is preferably 0.050 to 0.125 inch, although it may be thicker.

In casting the barrels, the use of gas fired or induction furnaces is the preferred method of heating, but the invention is not restricted to the use of any particular furnace type. Moreover, the barrels may be manufactured by hot isostatic pressing.

The barrels may be used in injection molding and extrusion processes, for example, in the processing of plastics, chemicals, foods, ceramics and metal powders. Their use in injection molding and extrusion of plastics, as described above, is the main use contemplated.

BRIEF DESCRIPTION OF THE DRAWING

In the appended drawing.

PREFERRED EMBODIMENTS OF THE INVENTION

Figures 1, 2:
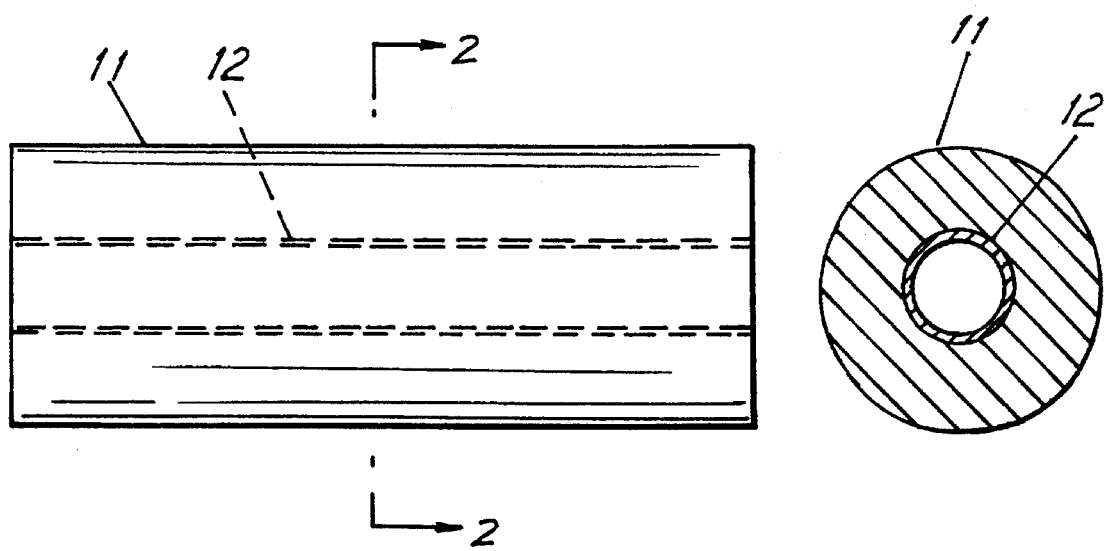
FIG. 1 represents a side view of a barrel of this invention and FIG. 2 represents a cross section of the barrel taken at line 2—2.

In the appended drawing, the backing layer is shown at 11 and the inlay at 12.

The following embodiments illustrate the invention, the numerical values being of parts by weight. In each case, a gas-fired furnace was used for heating. Centrifugal casting was performed as follows: The cylinder was heated to a temperature above the melting point of the inlay alloy, and inlay alloy was cast inside the cylinder. The cylinder was cooled to room temperature and then was honed and machined to size.

EXAMPLE 1

A bimetallic barrel with the following dimensions was cast:

| ID: | OD: | Length: | Inlay Layer Thickness: |
|---|---|---|---|
| 75 mm; | 194 mm; | 762 mm; | 0.075 inch |

The microalloyed steel used as the backing steel had the following chemical composition:

|   | C | Mn | Si | V | Fe |
|---|---|----|----|---|----|
| micro-alloyed steel 1 | 0.34 to 0.39 | 1.2 to 1.5 | 0.5 to 0.8 | 0.08 to 0.13 | bal bal |

The specific chemical composition of the inlay of this example is the following:

| ID: | OD: | Length: | Inlay Layer Thickness: |
|---|---|---|---|
| 75 mm; | 194 mm; | 762 mm; | 0.075 inch |

A pressure test was conducted on a bimetallic barrel of this example; the barrel was pressured internally until it failed. At the failure point, the Von Mises stress and hoop stress at the bore were 129,780 psi and 85,810 psi, respectively. The Von Mises stress is also called effective stress and is defined by the following:

$$\text{Von Mises Stress} = \left[ \frac{(S_h - S_r)^2 + (S_r - S_a)^2 + (S_a - S_h)^2}{2} \right]^{1/2}$$

Where $S_h$, $S_r$, and $S_a$ are hoop stress, radial stress, and axial stress, respectively.

EXAMPLE 2

A bimetallic barrel of the same dimensions was made, except that the inlay layer was 0.070 inch thick. The inlay alloy was the same as that in Example 1. A slightly different microalloyed steel was used as the backing steel:

|   | C | Mn | Si | Cr | Ni | Cu | V | Fe |
|---|---|----|----|----|----|----|---|----|
| microalloyed steel 2 | 0.35 to 0.40 | 1.61 | 0.21 | 0.12 | 0.12 | 0.14 | 0.11 | bal |

This barrel was also pressure tested. The Von Mises stress and hoop stress at the failure point were 108,392 psi and 71,666 psi, respectively.

EXAMPLE 3

A standard commercial bimetallic barrel was made (ID 44.6 mm, OD 139.7 mm, and length 762 mm). The backing steel is the commonly used AISI 4140 steel, and its chemical composition is shown in the following.

| C | Mn | Si | Cr | Mo | Fe |
|---|----|----|----|----|----|
| 0.38 to 0.43 | 0.75 to 1.00 | 0.15 to 0.30 | 0.8 to 1.1 | 0.15 to 0.25 | Bal |

The inlay type was the same as that in Example 1, and the inlay was 0.75 inch thick. The pressure test results show that the Von Mises stress and hoop stress at failure were 85,018 psi and 54,000 psi, respectively.

Based on the pressure test results, the pressure carrying capability of a bimetallic barrel made of a microalloyed steel is 30 to 50% higher than that made of a typical alloy steel, such as AISI 4140.

In their as cast conditions, the tensile and yield strengths of the of the above two microalloyed steels are also much higher than those of 4140 backing steel, as shown in the following:

|   | Yield Strength (psi) | Tensile Strength (psi) |
|---|---|---|
| As-Cast 4140 | 54,400 | 108,100 |
| As-Cast Micro-alloyed Steel 1 | 89,100 | 139,400 |

Under a slow cooling condition, microalloyed steel is significantly stronger than regular alloy steel.

Various resins and flame retardants release halogen acids, which attack the bore of extrusion and injection barrels. As described above, the inlay with tungsten carbide particles embedded in a nickel alloy matrix (Alloy (A)) is widely used to resist corrosion and wear. We found that adding a small amount of copper to this inlay alloy further improves its corrosion resistance. The composition of this inlay containing copper is as follows:

|     | C | Si | B | Cr | Fe | Ni | Co | W | Cu |
|-----|---|----|---|----|----|----|----|----|----|
| (B) | 1.3 to 3.5 | 0.5 to 3.3 | 1.0 to 3.0 | 5.0 max | 25 max | Bal | 3.0 to 7.0 | 25.0 to 50.0 | 1.0 to 5.0 |

Preferred composition ranges of Alloys A and B are as follows:

|       | C | Si | B | Cr | Fe | Ni | Co | W | Cu |
|-------|---|----|---|----|----|----|----|----|----|
| (A$_1$) | 1.5 to 3.0 | 1.2 to 2.8 | 1.0 to 2.5 | 1.0 to 5.0 | 18.0 max | Bal | 3.0 to 7.0 | 40 to 50 | |
| (B$_1$) | 1.5 to 3.0 | 1.0 to 2.8 | 1.0 to 2.5 | 18.0 to 5.0 | Bal max | 3.0 | 40 to 7.0 | 1.0 to 50 | to 3.0 |

EXAMPLE 4

The following inlay alloys were cast:

| Alloy | C | Cr | Fe | Si | Cu | W | B | Ni | Co |
|-------|---|----|----|----|----|---|---|----|----|
| a | 2.2 | 3.3 | 0.2 | 2.5 |    | 40. | 1.6 | bal | 6.9 |
| b | 2.1 | 3.1 | 0.2 | 2.4 | 5.0 | 38. | 1.5 | bal | 6.6 |

Corrosion tests were conducted on these alloys. Alloy samples (10 gm each) were submerged in 10 volume % HCl and 10 volume % HBr aqueous solutions at 100° C. for four hours. The weight losses of the alloy samples are shown in the following table:

| Alloy | Weight Loss in 10 Volume % HCl at 100 C. (mg) | Weight Loss in 10 Volume % HBr at 100 C. (mg) |
|-------|---|---|
| (a) | 268.3 | 28.6 |
| (b) | 55.8 | 6.2* |

*Instead of a weight loss, there is a weight gain after the test.

The corrosion test result shows that adding copper to Alloy (A) increases its corrosion resistance significantly. Alloy (B) containing copper may be used as an inlay alloy in connection with any of the herein described backing steels.

As mentioned above, alloy steels such as 4140, 6150, and 8620 are often used as the backing steel for bimetallic barrels. These steels have relatively high hardenability and will transform to bainite or even martensite when they are cooled from the centrifugal casting temperature to room temperature in air. These transformations cause a volume expansion in the steel, resulting in inlay cracking. The steel barrels have to be covered by insulation materials to slow their cooling. Barrels often become warped during this cooling stage. The barrels then have to go through a costly straightening process. Besides, the residual stresses from straightening can cause the barrel to distort in the plasticizing process. The barrel and the screw inside the barrel then become out of alignment, and, as a result, seizure or severe wear can happen.

We have found that for low pressure extrusion and injection applications, using carbon steels, such as 1045 and 1060, as the backing steel has the following advantages:

a) The low hardenability of carbon steel allows bimetallic barrels to fast cool in air without cracking the inlay.

b) Barrels can be cooled on a set of rotating rolls to maintain excellent straightness. The straightness of a 170" long barrel can warp by 0.25" when it is cooled in an insulation sand pit. Its straightness will be off by only about 0.025" if it is cooled on the rolls.

It is to be understood that all the above described alloys may contain trace impurities, such as sulfur and phosphorus, in addition to the elements listed.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bimetallic barrel for use in injection molding and extrusion, said barrel formed of a backing steel and a metal inlay liner, said backing steel being selected from the group consisting of microalloyed steels, carbon steel 1045 and carbon steel 1060, and said metal inlay liner formed of an alloy selected from the group consisting of alloys A and B shown in the following table:

|     | C | Si | B | Cr | Fe | Ni | Co | W | Cu |
|-----|---|----|---|----|----|----|----|----|----|
| (A) | 1.3 to 3.5 | 0.5 to 3.3 | 1.0 to 3.0 | 5.0 max | 25 max | Bal | 3.0 to 7.0 | 25.0 to 50.0 | |
| (B) | 1.3 to 3.5 | 0.5 to 3.3 | 1.0 to 3.0 | 5.0 max | 25 max | Bal | 3.0 to 7.0 | 25.0 to 50.0 | 1.0 to 5.0. |

2. A bimetallic barrel as claimed in claim 1, wherein said backing steel is a microalloyed steel.

3. A bimetallic barrel as claimed in claim 2, wherein said microalloyed steel contains 0.30 to 0.45% carbon, 1.0 to 1.7% manganese, 0.15 to 1.0% silicon, 0.05 to 0.2 vanadium and the balance iron.

4. A bimetallic barrel as claimed in claim 2, wherein said microalloyed steel contains 0.34 to 0.40% carbon, 1.20 to 1.65% manganese, 0.15 to 0.80% silicon, 0.08 to 0.13% vanadium and the balance iron.

5. A bimetallic barrel as claimed in claim 1, wherein the composition of the metal inlay is as follows:

|     | C | Si | B | Cr | Fe | Ni | Co | W |
|-----|---|----|---|----|----|----|----|----|
| (A) | 1.3 to 3.5 | 0.5 to 3.3 | 1.0 to 3.0 | 5.0 max | 25 max | Bal | 3.0 to 7.0 | 25.0 to 50.0 |

6. A bimetallic barrel as claimed in claim 1, wherein the composition of the metal inlay is as follows:

|     | C | Si | B | Cr | Fe | Ni | Co | W | Cu |
|-----|---|----|---|----|----|----|----|----|----|
| (B) | 1.3 to 3.5 | 0.5 to 3.3 | 1.0 to 3.0 | 5.0 max | 25 max | Bal | 3.0 to 7.0 | 25.0 to 50.0 | 1.0 to 5.0 |

7. A bimetallic barrel as claimed in claim 6, wherein said backing steel is selected from the group consisting of carbon steel 1045 and carbon steel 1060.

8. A bimetallic barrel as claimed in claim 6, wherein said backing steel is a microalloyed steel.

9. A bimetallic barrel as claimed in claim 1, wherein said metal inlay liner is formed of an alloy selected from the group consisting of alloys $A_1$ and $B_1$ shown in the following table:

|        | C          | Si         | B          | Cr         | Fe          | Ni  | Co         | W         | Cu         |
|--------|------------|------------|------------|------------|-------------|-----|------------|-----------|------------|
| $(A_1)$ | 1.5 to 3.0 | 1.2 to 2.8 | 1.0 to 2.5 | 1.0 to 5.0 | 18.0 max    | Bal | 3.0 to 7.0 | 40 to 50  |            |
| $(B_1)$ | 1.5 to 3.0 | 1.2 to 2.8 | 1.0 to 2.5 | 1.0 to 5.0 | 18.0 max    | Bal | 3.0 to 7.0 | 40 to 50  | 1.0 to 3.0 |

* * * * *

UNITED STATES PATENT AND TRADEMARK OFFICE
CERTIFICATE OF CORRECTION

PATENT NO.   : 5,565,277
DATED        : October 15, 1996
INVENTOR(S)  : Cox, Jr. et al.

It is certified that error appears in the above-indentified patent and that said Letters Patent is hereby corrected as shown below:

Column 3, after line 61, delete the table, and insert the following:

| W    | Cr  | Ni   | Co  | Fe  | B   | C   | Si  |
|------|-----|------|-----|-----|-----|-----|-----|
| 46.9 | 2.6 | 32.0 | 4.7 | 7.9 | 1.3 | 2.6 | 1.8 |

Signed and Sealed this

Fifteenth Day of April, 1997

BRUCE LEHMAN

Attest:

Attesting Officer

Commissioner of Patents and Trademarks